(12) United States Patent
Kjell et al.

(10) Patent No.: US 8,480,118 B2
(45) Date of Patent: Jul. 9, 2013

(54) AIRBAG WITH A FLEXIBLE FASTENING TAB

(75) Inventors: Fredrik Kjell, Allingsas (SE); Jack Kroll, Lerum (SE); David Karlsson, Vargarda (SE); Ken Lindberg, Vargarda (SE); Andreas Jorlöv, Allingsas (SE); Ridvan Oral, Altomünster (DE)

(73) Assignee: Autoliv Development AB, Vargarda (SE)

( * ) Notice: Subject to any disclaimer, the term of this patent is extended or adjusted under 35 U.S.C. 154(b) by 450 days.

(21) Appl. No.: 12/445,767

(22) PCT Filed: Oct. 11, 2007

(86) PCT No.: PCT/EP2007/008836
§ 371 (c)(1),
(2), (4) Date: Oct. 12, 2010

(87) PCT Pub. No.: WO2008/046550
PCT Pub. Date: Apr. 24, 2008

(65) Prior Publication Data
US 2011/0042921 A1 Feb. 24, 2011

(30) Foreign Application Priority Data
Oct. 16, 2006 (DE) .......................... 10 2006 049 418
Feb. 20, 2007 (DE) .......................... 10 2007 008 649

(51) Int. Cl.
*B60R 21/213* (2011.01)
(52) U.S. Cl.
USPC ..................... 280/728.2; 280/730.2

(58) Field of Classification Search
USPC ............................................. 280/728.2, 730.2
See application file for complete search history.

(56) References Cited

U.S. PATENT DOCUMENTS

| | | | |
|---|---|---|---|
| 7,163,231 B2* | 1/2007 | Kumagai | 280/730.2 |
| 7,547,038 B2* | 6/2009 | Coleman | 280/728.2 |
| 8,007,002 B2* | 8/2011 | Kalandek et al. | 280/740 |
| 8,091,918 B2* | 1/2012 | Mitchell et al. | 280/728.2 |
| 8,136,833 B2* | 3/2012 | Baumgartner | 280/728.2 |
| 2003/0042712 A1* | 3/2003 | Henderson et al. | 280/728.2 |
| 2004/0104561 A1* | 6/2004 | Maertens | 280/730.2 |
| 2011/0042921 A1* | 2/2011 | Kjell et al. | 280/728.2 |
| 2011/0057422 A1* | 3/2011 | Cheal et al. | 280/728.2 |
| 2011/0079989 A1* | 4/2011 | Baumgartner | 280/728.2 |

FOREIGN PATENT DOCUMENTS

| | | |
|---|---|---|
| EP | 0 878 363 | 11/1998 |
| EP | 1 338 482 | 8/2003 |
| EP | 1 580 083 | 9/2005 |
| EP | 1 683 690 | 7/2006 |
| WO | WO 2005/049390 A1 | 6/2005 |
| WO | WO 2005/094390 A1 | 10/2005 |

* cited by examiner

*Primary Examiner* — Karen Beck
(74) *Attorney, Agent, or Firm* — Brinks Hofer Gilson & Lione

(57) ABSTRACT

The invention relates to an airbag comprising a flexible fastening tab (3) having a fastening opening (4) for attachment to a motor vehicle by means of a form-locking element (2), whereby a fastening region (14) and a folding region (15) are constructed in the tab (3), the fastening opening (4) is constructed in the fastening region (14) and a folding opening (5) is constructed in the folding region (15), and whereby the folding opening (5) is dimensioned such that the folding region (15) can fold at least partially over the form-locking element (2).

23 Claims, 5 Drawing Sheets

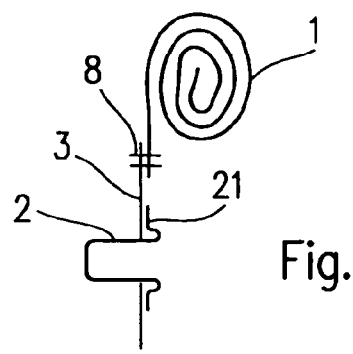
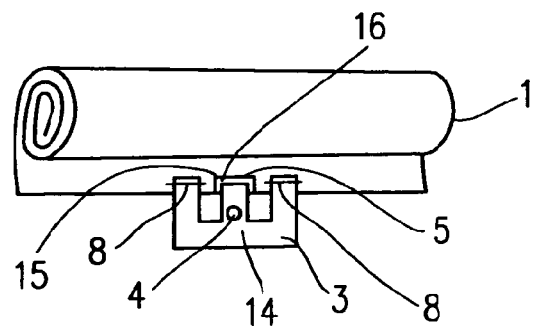
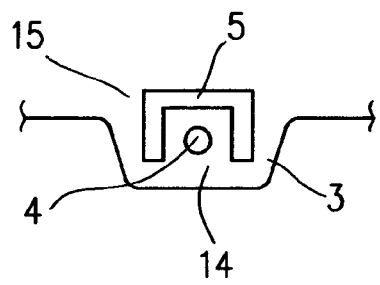
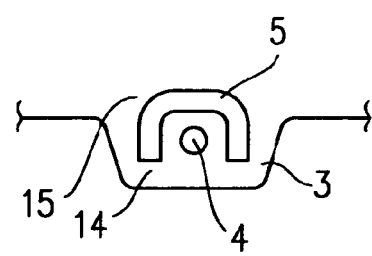
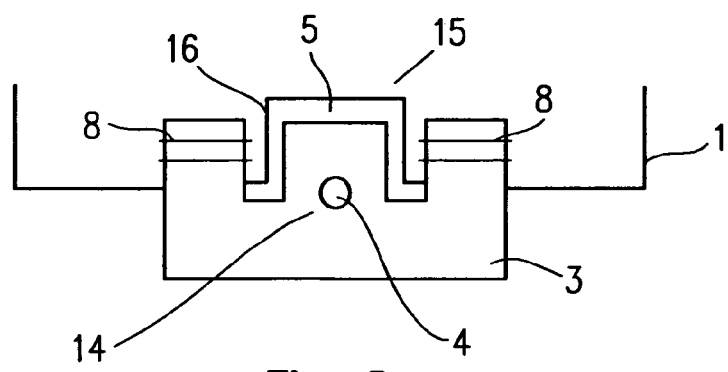

AIRBAG WITH A FLEXIBLE FASTENING TAB

CROSS REFERENCE TO RELATED APPLICATION

This application claims priority to PCT/EP2007/008836, filed Oct. 11, 2007, which claims the benefit of German Patent Application No. 10 2007 008 649.2, filed Feb. 20, 2007, and German Patent Application No. 10 2006 049 418.0, filed Oct. 16, 2006.

FIELD OF THE INVENTION

The present invention relates to an airbag comprising a flexible fastening tab having a fastening opening for attachment to a motor vehicle by means of a form-locking element.

BACKGROUND AND SUMMARY OF THE INVENTION

Airbags, particularly so-called inflatable curtains, are fastened to the roof frame of the motor vehicle by way of fastening tabs in a vehicle structure above the window line. To this end, the flexible fastening tabs are generally held on the roof frame by way of form-locking elements employed to ensure that the rolled-up airbag remains in the assembled, collapsed, or folded state until it is activated. In order to maximize the installation space in light of the space conditions in the roof frame region, the airbag is accommodated above the fastening tabs. Such an attachment is known from WO 2005/094390 A1. One drawback of such an arrangement is that the form-locking element generally forms a sharp edge on which the fastening tab is bent when the airbag extends downward during deployment and covers the windows. This may result in local overloads in the tab and the form-locking element, as well as tearing or rupturing, which is to be avoided for safety reasons.

It is therefore one object of the present invention to provide an airbag which prevents or avoids such a risk. The airbag according to the present invention includes a flexible fastening tab having a fastening opening for attachment to a motor vehicle by means of a form-locking element, wherein a fastening region and a folding region are constructed in the tab. The fastening opening is constructed in the fastening region and a folding opening is constructed in the folding region, and the folding opening is dimensioned such that the folding region can at least partially fold over the form-locking element. The folding opening is consequently dimensioned large enough such that the folding region can be folded around the form-locking element, which extends through the folding opening, while the form-locking element itself projects through the fastening opening and attaches the fastening region to the motor vehicle. The folding opening is therefore dimensioned larger than the fastening opening.

According to one embodiment of the present invention, the fastening region and the folding region are placed on top of each other, wherein in an inactive state, the fastening opening is disposed opposite the folding opening or rests thereon.

According to another embodiment of the present invention, the fastening opening is positioned centrally in the folding opening, wherein this positioning applies to the assembled state. The present invention also provides that the folding region can be folded onto the fastening region, and that a folding line of the tab runs on the lower edge of the folding opening such that the entire region of the folding opening can be used. Folding the tab into a two-layer fastening tab has the advantage that only one material cut is required, thereby reducing logistical complexity and assembly effort.

The folding region and the fastening region of the tab can be fixed to each other and preferably are glued, welded, or sewn to each other, whereby strong connections of the folding region to the fastening region can be created in a simple manner.

In order to enable the bag and the folding region to easily fold down, the fastening region and the folding region are fixed in a line shape against each other, wherein the line-shaped fixation runs parallel or collinear to the folding axis of the folding region. The point of the fixation is located in the region of the fastening opening or beneath the fastening opening in order to provide sufficient folding space, such that the folding region can still surround the head of the fastening apparatus, and the head of the fastening means can still penetrate the region of the folding opening located above the fixation.

According to yet another embodiment of the present invention, a C-shaped material recess is constructed around the fastening opening as a folding opening, the center segment of which is disposed between the fastening opening and the bag, wherein the side segments of the folding opening extend to the form-locking element. In this way, it is possible for the fastening tab to carry out a fold and hinge function, by means of which it is possible for the fastening tab and hence the entire airbag to fold past the form-locking element (which may be a fastening clip or a screw, for example) such that no sharp edges and bending strain are applied to the fastening tab in the operating position.

According to yet another embodiment of the present invention, the side segments of the material recess facing away from the airbag can extend beyond the form-locking element in order to ensure that no contact occurs during the pivoting motion about an axis extending through the end points of the side segments. For safety reasons, it is provided that the side segments have at least a length that corresponds to the extension of the form-locking element in the tensile direction, wherein it is assumed that the extension in the tensile direction is no greater than the extension perpendicular to the fastening plane of the airbag. The length of the side segments must be large enough such that folding past the form-locking element is possible without contact therewith.

The material recess for the folding opening can be stamped in, cut out, or melted out, whereby the material recess can preferably be rounded. In the assembled state, the airbag is disposed on a first side, above the form-locking elements, for example, whereby in the event that the fastening tabs and the corresponding center segment of the C-shaped recess are not substantially horizontally arranged, the airbag in the deployed state is disposed on a different side of the form-locking element than in the assembled state.

In addition to introducing a material recess in a sewn-in tab, or in a tab constructed on the airbag, the material recess may be configured around the form-locking element between a material cutout in the bag and a tab fastened to the bag, the fastening opening being introduced in the tab in order to receive the form-locking element. The material recess is then formed by an open space that is formed between the bag and the sewn-on, welded-on, or glued-on tab. One aspect of this embodiment provides that the tab has a material strip in which the fastening opening is constructed, and at least one further material strip to which the bag is fastened. Preferably, in addition to the material strip having the fastening opening, two further material strips are constructed and sewn onto the bag such that a shape of the tab is formed similar to an E-shaped tab. The corresponding bag region has a recess in the region of the center strip such that the bag can be pivoted freely about the center strip in which the fastening opening is disposed with the form-locking element.

The bag is fastened to the folding region, and preferably it is sewn on, welded on, or glued on the folding region, whereby the fastening is preferably carried out at the end of the folding region opposite the folding line.

In a two-part refinement of the tab, fastening is carried out at the end of the folding region that is not connected to the fastening region.

Moreover, the folding opening is larger than the head region of the form-locking element in order to facilitate passage.

In the assembled state, the bag is preferably disposed such that it abuts a first side of the form-locking element. In the inflated state, the bag is disposed such that it abuts a second side of the form-locking element that is opposite the first side. Thus, after or during the inflation of the bag, the bag, and hence also at least part of the folding region, is folded over.

In the deactivated state, the bag is preferably rolled up, whereby the rolling-up action occurs in the direction away from the fastening region, and hence away from the fastening structure such as the automotive body, and the folding region is disposed on the side of the fastening region that faces away from the fastening structure of the motor vehicle.

The tab is preferably made of a woven fabric, wherein the woven fabric is preferably not made of the material of which the bag is produced. The bag fabric is generally of a higher quality and provided with a coating, and may therefore be too expensive for use as a fastening tab.

The fastening tab can be constructed separately and fastened to the airbag, whereby the tab may be made of a woven fabric that corresponds to the airbag fabric. Provided that no high thermal strain occurs in the fastening region, the tab can be made of a woven fabric that is different from the airbag fabric. The tab is therefore preferably constructed separately and fastened to the bag, e.g., the tab may be glued on, sewn on, or welded on the bag.

The folding opening, just like the fastening opening, can be stamped in, cut out, or melted out, wherein the openings in particular can be configured in a rounded shape in order to avoid tension peaks and to minimize strain applied on the woven fabric.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

The present invention will be explained in more detail below with reference to the attached figures, wherein:

FIG. 4 is a schematic sectional illustration of a bag according to one embodiment of the present invention;

FIG. 5 is a schematic, perspective view according to FIG. 4;

FIGS. 6-8 illustrate variant constructions of a fastening device for use with the airbag of FIG. 4;

DETAILED DESCRIPTION OF THE INVENTION

Figure 1:
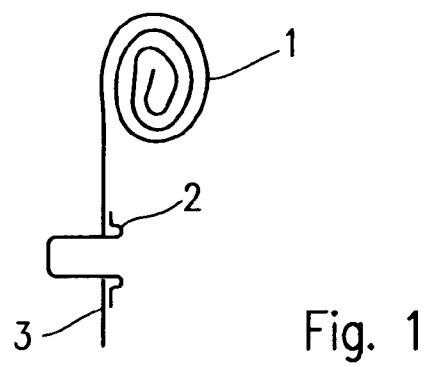
FIG. 1 is a schematic side view of a conventional airbag.
Figure 2:
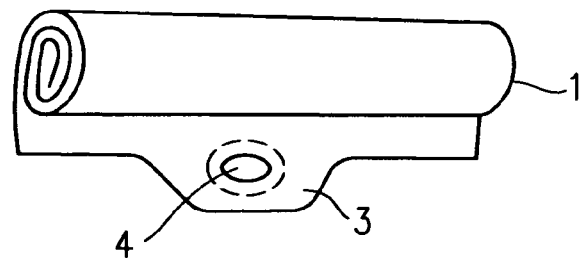
FIG. 2 is a perspective cutout illustration according to FIG. 1.
Figure 3:
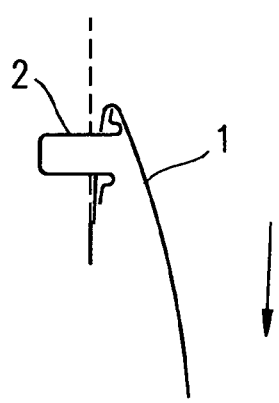
FIG. 3 is a schematic illustration of the airbag of FIG. 1 in a deployed state.

FIG. 1 shows a sectional view of a conventional airbag having a bag 1 in a rolled-up state. The airbag is held positively on a vehicle structure (not shown) by way of a form-locking element such as a fastening clip 2. In the position shown, the rolled-up bag 1 is disposed above the form-locking element 2, and the airbag, which is preferably constructed as an inflatable curtain, is mounted beneath a roof paneling above a window cutout of a vehicle. On the bag 1, or in the edge region, tabs 3 are provided, which can be constructed as one piece with the bag 1 or sewn thereon. As shown in FIG. 2, inside each tab 3, a fastening opening 4 is provided, through which the form-locking element 2 is pushed. When the bag 1 is filled by a gas generator (not shown), the bag 1 unrolls and extends downward, as shown in FIG. 3. The deployment motion is indicated by the arrow in FIG. 3. During deployment, high tensile forces and strains occur, particularly on the upper part of the form-locking element 2, such that the form-locking element can be damaged. Furthermore, the airbag fabric and/or the tab material may be exposed to high strains as a result of the sharp edge of the form-locking element 2, which rests against the material of the tab 3, thereby resulting in potential material failure. The form-locking element 2 can either fail or cut the airbag fabric, resulting in possible uncertainties in the fastening.

FIG. 4 shows the fastening of an airbag according to the present invention, wherein the rolled-up bag 1 is disposed above the form-locking element 2. In FIG. 4, the fastening tab 3 is constructed as a separate woven fabric, which is fastened to the airbag fabric by way of a fastening seam 8. Instead of a seam 8, the tab 3 can alternatively be welded on or glued on, and in principle, one-piece configurations of the fastening tab 3 may also be provided.

FIG. 5 shows the airbag with the rolled-up bag 1 before installation. A tab 3 is sewn onto the bag 1 by way of two fastening seams 8. To this end, the fastening tab 3 is constructed as a horizontal E-shaped tab having three strips or tabs, wherein a fastening opening 4 is constructed in the center tab. The region around the fastening opening 4 is the fastening region 14. The two side tabs are sewn onto the bag 1 by way of the fastening seams 8. In the bag 1, a recess 16 is provided such that in conjunction with the center tab, a C-shaped material recess defining a folding opening 5 is constructed, wherein the folding opening extends between the bag 1 and the fastening opening 4. The center segment of the folding opening 5 is located between the fastening opening 4 and the bag 1, and the side segments extend on both sides of the fastening opening 4, and in the assembled state, the side segments extend on both sides of the form-locking element 2. The region of the tab 3 or the bag 1 around the folding opening 5 is referred to as the folding region.

FIG. 6 shows a single-piece configuration of the tab 3 having a C-shaped material recess or folding opening 5 around the fastening opening 4, wherein the folding opening 5 has segments that are oriented substantially at a right angle to each other.

FIG. 7 shows a rounded, semi-circular embodiment of the material recess 5.

Figure 9:
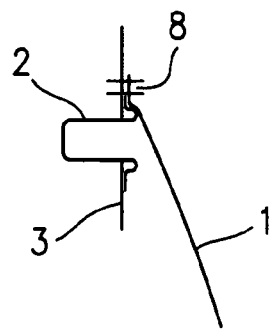
FIG. 9 is a schematic illustration of the bag according to the invention in the deployed state.

FIG. 8 shows the material recess 5 according to FIG. 5 in an enlarged and more detailed view. The two side tabs are fastened to the bag 1 by way of the fastening seams 8. The center tab with the fastening opening 4 projects into a material cutout 16 inside the bag 1 and thus forms the C-shaped material recess 5, the side segments of which can be sufficiently long such that the bag 1 disposed above the fastening opening 4 can fold downward without any tensile strain being applied only to the upper end of the form-locking element 2. Furthermore, the side segments are constructed having a length such that the bag 1 can fold past the form-locking element 2 without contact therewith, said form-locking element being constructed as a clip or screw. As best shown in FIG. 9, the tab 3 acts as a hinge such that the bag 1 can fold completely downward after the gas generator has been activated and deployment has commenced.

Figure 10:
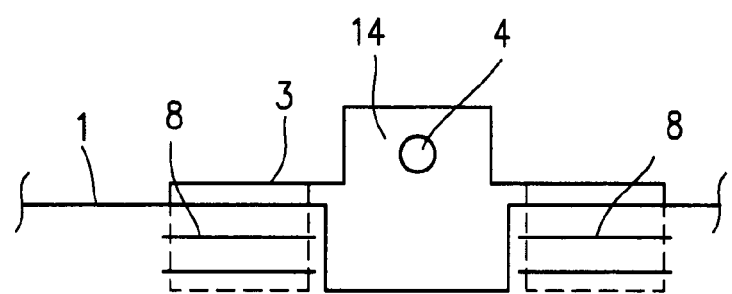
FIG. 10 is a detailed illustration a top view of the bag in the deployed state.

FIG. 10 shows a top view of the bag according to a folded-down or folded-over state. The side tabs of the tab 3 are folded over at the height of the side segments of the material recess 5 and disposed beneath the bag 1, which is indicated by the dotted line. In addition, the fastening seams 8 are apparent. Instead of high material strain on the form-locking element 2 and the airbag fabric, the center tab is now subjected to a uniform tensile strain, without any irregular load distribution.

Figure 11:
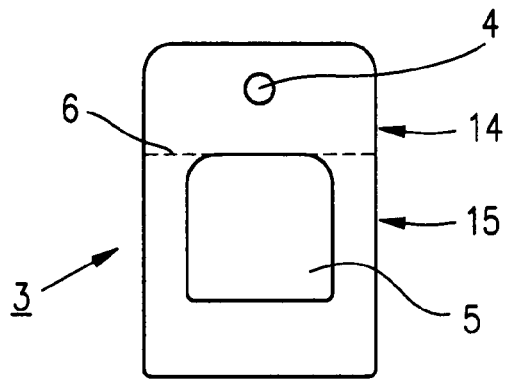
FIG. 11 is a blank of a tab according to another embodiment of the present invention.

Referring now to FIG. 11, a schematic top view of a tab 3 made of a flexible material, particularly a woven fabric, is shown comprising a fastening opening 4 defining a round hole, and a folding opening 5, which is constructed at a distance from the fastening opening 4 in the tab 3. Along a folding line 6, a blank of the tab 3 can be folded such that the region associated with the fastening opening 4 can be referred to as a fastening region 14 and the region associated with the folding opening 5 can be referred to as a folding region 15. In contrast to a round hole, the fastening opening 4 can also be angled, depending on the fastening means with which the tab 3 and hence the bag 1 are fixed to a vehicle structure (not shown).

The folding opening 5 is surrounded completely by the woven fabric of the tab 3. Alternatively, the tab 3 may be constructed as two parts, wherein the fastening region 14 and the folding region 15 are sewn, welded, or glued together in the region in which the folding line 6 in FIG. 11 is located.

Figure 12:
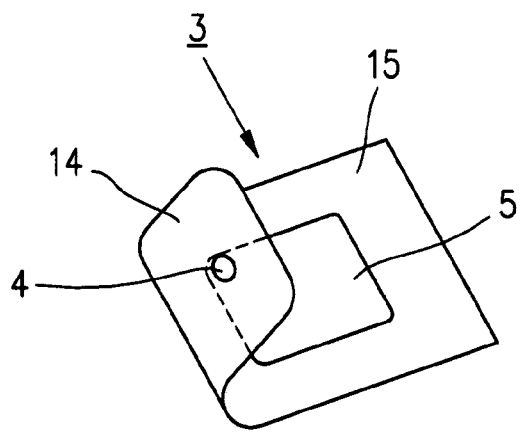
FIG. 12 illustrates the tab having a folded-over fastening region.
Figure 13:
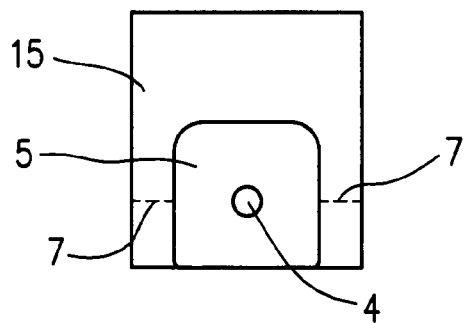
FIG. 13 is a top view of the folding region illustrating the folded-over tab.

In FIG. 12, the tab 3 is shown in an intermediate stage in which the fastening region 14 is folded up and placed on the folding region 15. FIG. 13 shows the final stage of the folding motion in which the folding region 15 rests against the fastening region 14. In FIG. 13, the folding region 15 is disposed above the fastening region 14. It is apparent that the folding opening 5 is larger than the fastening opening 4 and that the fastening opening 4 is located substantially centrally inside the folding opening 5. It should be understood to those of ordinary skill in the art that other arrangements of the fastening opening 4 inside the folding opening 5 in the collapsed or folded state of the fastening region 14 and the folding region 15 are also possible.

For fixation of the fastening and folding regions 14, 15, two seams 7 extending parallel to the folding line 6 are provided, wherein the seams may be sewn, welded, or glued. Along these seams 7, the folding region 15 folds downward, wherein the folding opening 5 is of such large dimension that the folding region 15 folds substantially downward without contact with the form-locking element 2 or a head part 21 (shown in FIG. 15) of the form-locking element 2.

Figure 14:
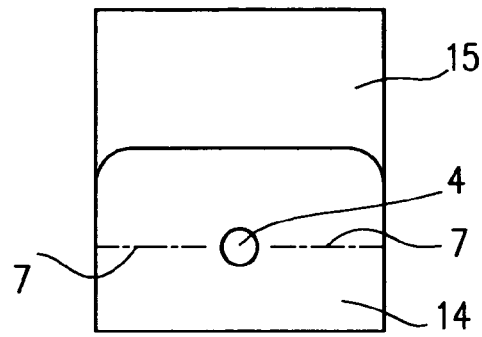
FIG. 14 is a top view of the fastening region illustrating the folded-over tab of FIG. 13.

FIG. 14 shows FIG. 13 according to a 180° rotation, wherein the fastening region 14 is folded onto the folding region 15 and rests on the upper side.

Figure 15:
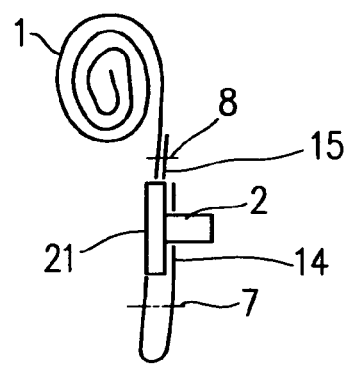
FIG. 15 is a schematic cross-sectional view of the airbag in the assembled state.

FIG. 15 shows a schematic sectional illustration of a fastened airbag with a rolled-up bag 1, on which the tab 3, along with the folding region 15 and the fastening tab 14, are fastened by way of a fastening seam 8, such as sewn seam. The folding region 15 and the fastening region 14 are folded onto each other and fixed to each other by way of the fastening seam 7, such that the bag 1 is substantially held in position by the two-layer tab 3. The form-locking element 2 with the head 21, which is larger than the fastening opening 4, penetrates the fastening opening 4 of the fastening region 14 and fixes the airbag to the vehicle structure (not shown). To this end, the head 21 is surrounded by the folding opening 5, wherein the folding opening 5 is dimensioned such that the region of the folding region 15 disposed above the connecting seam 7 can fold downward.

The bag 1 is rolled up in the direction toward the fastening region 14, e.g., counterclockwise in the present example. Thus, the bag 1 is rolled away from the wall of the automotive body and the fastening region 14, so that it can be unrolled more easily toward the outside. The fastening of the bag 1 to the folding region 15 is carried out at the upper end of the folding region 15, i.e., the end that is disposed opposite the folding line 6, or at the connecting point of the folding region 15 to the fastening region 14.

Figure 16:
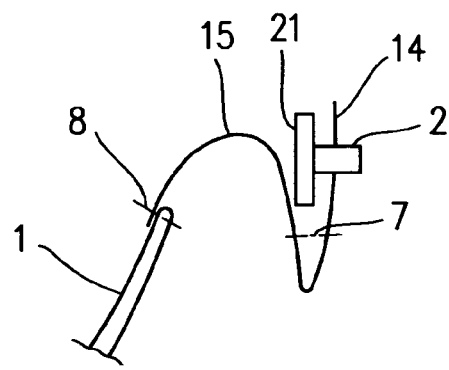
FIG. 16 is a schematic view of the airbag in the activated state.

FIG. 16 shows the airbag in the deployed state, wherein the bag 1 is now shown as being disposed on the side of the fastening element 2 that is opposite than the side of the fastening element 2 that the bag 1 is disposed on in FIG. 15. The folding region 15 is folded downward approximately at the height of the connecting seam 7 and is fixed to the fastening region 14 by the connecting seam 7. The folding region 15 is pivoted across the head 21 of the form-locking element 2 and allows the bag 1 to be folded down easily, so that it can be placed in front of a window opening. By arranging the connecting seam 7 at different heights, it is possible to vary the range of coverage of the bag 1. In addition, a variation of the range of coverage of the bag 1 in the deployed state can be achieved by a variation of the arrangement of the fastening seam 8.

The two-layer design of the tab 3 provides increased strength. Moreover, a single-piece configuration of the tab 3 requires only a few production steps, and it is not necessary to stock several blanks.

The form-locking element 2 can be constructed as a screw or as a clip, which is inserted in a receptacle in the vehicle structure to fix the fastening tab together with the bag 1 on the vehicle structure. The connecting seam 7 makes it possible to localize the deployment force in the optimum position. Likewise, the connecting seam 7 minimizes the effective length of the tab 3 after deployment and can additionally act as an energy-absorbing element resulting in relief inside the tab 3 during tearing or failure of the seam, which does not jeopardize the fastening of the bag 1 to the vehicle structure, although a slight displacement of the bag must be tolerated.

As a result of the folding opening 5, bending torque on the form-locking element 2 is avoided such that during a fastening using an inserted clip, there is no risk that the clip is pushed out upon activation of the bag 1.

The force is applied only perpendicularly to the longitudinal extension of the form-locking element 2, i.e., perpendicular to the insertion direction of the screw or the clip, for example, such that increased stability and reliability of the fastening of the airbag or bag is achieved.

The embodiments of the airbag are not limited to roof-mounted airbags, and can be used wherever the airbag in the installed position is disposed opposite the fastening element or the form-locking element and must move to the other side of the form-locking element during deployment.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. An airbag comprising:
    an airbag body;
    a flexible fastening tab fastened to the airbag body for attachment to a motor vehicle by means a form-locking element;
    a fastening region and a folding region formed by the fastening tab;
    a fastening opening formed by the fastening region; and
    a folding opening formed by the folding region, the folding opening forming a through-hole free of any material and extending through the entire fastening tab between the fastening region and the airbag body, the folding opening being dimensioned such that the folding region can fold at least partially over the form-locking element.

2. The airbag according to claim 1, wherein the fastening region and the folding region are placed on top of each other, and
    wherein the fastening opening lies opposite the folding opening.

3. The airbag according to claim 1, wherein the fastening opening is centrally positioned in the folding opening.

4. The airbag according to claim 1, wherein the folding region is folded onto the fastening region, and
    wherein a folding line of the tab runs at a bottom edge of the folding opening.

5. The airbag according to claim 1, wherein the folding region and the fastening region are fixed to each other by any means selected from the group consisting of gluing, sewing, and welding.

6. The airbag according to claim 5, wherein the fastening region and the folding region are fixed in a line-shape against each other.

7. The airbag according to claim 5, wherein a fixation exists in one of a region of the fastening opening or beneath the fastening opening.

8. The airbag according to claim 1, wherein the folding opening is formed as a C-shaped material recess around the fastening opening, the C-shaped material recess having a center segment and a plurality of side segments, the center segment being disposed between the fastening opening and the airbag, and the plurality of side segments extending to the form-locking element.

9. The airbag according to claim 8, wherein side segments of the plurality of side segments facing away from the airbag extend beyond the form-locking element.

10. The airbag according to claim 8, wherein the plurality of side segments have a length corresponding to at least an extension of the form-locking element in a direction of tension.

11. The airbag according to claim 8, wherein the C-shaped material recess is formed between a material cut-out in the airbag and the fastening tab, the fastening tab being fastened to the airbag, and
    wherein the fastening opening is introduced in the fastening tab.

12. The airbag according to claim 11, wherein the fastening tab includes a material strip in which the fastening opening is formed, and
    wherein the fastening tab further includes at least one additional material strip fastened to the airbag by any means selected from the group consisting of gluing, sewing, and welding.

13. An airbag comprising:
    an airbag body;
    a flexible fastening tab for attachment to a motor vehicle by means a form-locking element;
    a fastening region and a folding region formed by the fastening tab;
    a fastening opening formed by the fastening region; and
    a folding opening formed by the folding region, the folding opening extending through the fastening tab between the fastening region and the airbag body and being dimensioned such that the folding region can fold at least partially over the form-locking element;
    wherein the airbag is fastened to the folding region by any means selected from the group consisting of gluing, sewing, and welding.

14. The airbag according to claim 4, wherein the airbag is fastened to an end of the folding region lying opposite the folding line.

15. The airbag according to claim 1, wherein the folding opening is larger than a head region of the form-locking element.

16. The airbag according claim 1, wherein the airbag body is disposed such that it abuts a first side of the form-locking element when the airbag is in an assembled state, and
    wherein the airbag is disposed such that it abuts a second side of the form-locking element when the airbag is in an inflated state, the second side being disposed opposite the first side.

17. The airbag according to claim 1, wherein the airbag body is rolled up when the airbag is in a deactivated state.

18. The airbag according to claim 17, wherein the airbag rolls up in a direction away from the fastening region, and
    wherein the folding region is disposed on a side of the fastening region facing away from the fastening structure.

19. The airbag according to claim 1, wherein the fastening tab is made of a woven fabric.

20. The airbag according to claim 1, wherein the fastening tab is separately formed on the airbag and is fastened thereto.

21. The airbag according to claim 1, wherein at least one of the folding opening and the fastening opening are formed by a means selected from the group consisting of stamping, cutting, and melting.

22. The airbag according to claim 1, wherein the folding opening defines a rounded shape.

23. An airbag comprising:
    an airbag body;
    a flexible fastening tab fastened to the airbag body for attachment to a motor vehicle by means a form-locking element;
    a fastening region and a folding region formed by the fastening tab;
    a fastening opening formed by the fastening region; and a folding opening formed by the folding region, the folding opening forming a through-hole free of any material and extending through the entire fastening tab between the fastening region and the airbag body, the folding opening being dimensioned such that the folding region can fold at least partially over the form-locking element, wherein the airbag is disposed on a first side above the form-locking element when the airbag is in an assembled state, such that the airbag folds downward and is disposed on an opposite second side of the form-locking element when the airbag is in a deployed state.

\* \* \* \* \*